US009817747B2

(12) United States Patent
Looney et al.

(10) Patent No.: US 9,817,747 B2
(45) Date of Patent: Nov. 14, 2017

(54) SYSTEMS AND METHODS FOR UNIT TESTING OF FUNCTIONS ON REMOTE KERNELS

(71) Applicant: Juniper Networks, Inc., Sunnyvale, CA (US)

(72) Inventors: Jonathan T. Looney, Syracuse, NY (US); Pranavadatta Devaki Narasimha Bhatta, Mysore (IN); Reji Thomas, Bangalore (IN); Satish Dattatri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/040,858

(22) Filed: Feb. 10, 2016

(65) Prior Publication Data
US 2017/0185508 A1    Jun. 29, 2017

(51) Int. Cl.
*G06F 11/36* (2006.01)

(52) U.S. Cl.
CPC ...... *G06F 11/3664* (2013.01); *G06F 11/3684* (2013.01); *G06F 11/3688* (2013.01)

(58) Field of Classification Search
CPC . G06F 11/3664; G06F 11/3688; G06F 11/323
USPC ........................................................ 717/125
See application file for complete search history.

(56) References Cited

U.S. PATENT DOCUMENTS

| 9,354,977 | B1* | 5/2016 | Backensto | G06F 11/1448 |
| 2001/0044904 | A1* | 11/2001 | Berg | G06F 21/52 726/26 |
| 2011/0022840 | A1* | 1/2011 | Stefan | G06F 12/1491 713/167 |
| 2013/0276056 | A1* | 10/2013 | Epstein | G06F 21/604 726/1 |
| 2015/0205948 | A1* | 7/2015 | Stefan | G06F 12/1491 726/22 |

OTHER PUBLICATIONS

Software framework, https://en.wikipedia.org/wiki/Software_framework, as accessed Jul. 28, 2016, Wikipedia, (Jan. 21, 2005).

(Continued)

*Primary Examiner* — John Chavis
(74) *Attorney, Agent, or Firm* — FisherBroyles, LLP

(57) ABSTRACT

The disclosed computer-implemented method may include (1) providing a framework that includes (A) a user-space component that runs at a client site and (B) a kernel-space component that runs at a remote site, (2) identifying attributes of objects that reside at the remote site and whose addresses are unknown at the client site, (3) generating a script to test a function of a kernel running on the remote site based at least in part on the attributes, and (4) performing a remote unit testing of the function of the kernel by executing the script such that the user-space component (A) generates a message that identifies the attributes and (B) sends the message to the kernel-space component to facilitate (I) obtaining references to the objects by way of the attributes and (II) invoking the function by way of the references. Various other methods, systems, and computer-readable media are also disclosed.

20 Claims, 6 Drawing Sheets

(56) References Cited

OTHER PUBLICATIONS

Jonathan T. Looney; Systems and Methods for Unit Testing of Operating System Kernels from User Space; U.S. Appl. No. 15/280,767, filed Sep. 29, 2016.

User space, https://en.wikipedia.org/wiki/User_space, as accessed Jul. 28, 2016, Wikipedia, (May 4, 2004).

Object (computer science), https://en.wikipedia.org/wiki/Object_(computer_science), as accessed Jul. 28, 2016, Wikipedia, (Mar. 15, 2004).

Macro (computer science), https://en.wikipedia.org/wiki/Macro_(computer_science), as accessed Jul. 28, 2016, Wikipedia, (Sep. 26, 2007).

* cited by examiner

| Relationship Table 400 |||
| --- | --- | --- |
| OBJECT | ATTRIBUTE | LOOKUP FUNCTION |
| Kernel Function | Name of Function | linker_file_foreach() linker_file_lookup_symbol() |
| Integer, Character, Primitive Type | Value Itself | Identify Function |
| Nexthop | Nexthop Index | rnh_lookup() |
| IPv4 Route | Route prefix, type | ip_rtmatch() |
| IPv6 Route | Route prefix, type | ip6_rtmatch() |
| Logical Interface | Interface Index | ifl_lookup() |
| Physical Interface | Interface Index | ifd_lookup() |
| Route Table | Family Type, Interface Index | GET_RTBL_FROMIFINDEX() |
| Mbuf | Mbuf Data | MGETHDR(), memcpy() |
| Protocol Family | Family Type, Interface Offset Value | iff_lookup() |
| Offset into Mbuf | Mbuf Parameter Index, Offset Value | Array Indexing with [], Mtod, Addition |
| Host Cache Entry | IPv6 Address, Interface Index | patricia_lookup() |
| Kernel Global Variable | Variable Name | linker_file_for_each(), linker_file_lookup_symbol() |
| Kernel Object Address | Variable Name | linker_file_for_each(), linker_file_lookup_symbol() |

*FIG. 4*

SYSTEMS AND METHODS FOR UNIT TESTING OF FUNCTIONS ON REMOTE KERNELS

BACKGROUND

Unit testing is often performed on software to ensure certain functionality and/or performance. For example, a technology developer may perform unit testing on an application and/or a patch to ensure suitable functionality and/or performance prior to release. Accordingly, unit testing may facilitate detecting bugs within software. However, while traditional unit testing has proven helpful in detecting software bugs in many contexts, such unit testing may still have certain deficiencies that limit its applicability and/or effectiveness in other contexts.

As a specific example, a technology developer may develop a network Operating System (OS) for certain network devices (such as routers and/or switches). In this example, the technology developer may implement certain traditional unit testing tools (such as IGLOO) to remotely test the kernel of the network OS during deployment. Unfortunately, such traditional unit testing tools may be unable to facilitate remote testing of individual kernel functions and/or their parameters. This inability to facilitate such remote testing may derive at least in part from the kernel functions' definitions, which call for and/or expect parameters to be passed by reference. In other words, the kernel functions may call for and/or expect objects residing in a remote address space to be passed as parameters by their respective addresses, which are not visible and/or known to the traditional unit testing tools.

In another traditional approach, the technology developer may be able to write test scripts that facilitate local testing of individual kernel functions and/or their parameters within the kernel itself. Unfortunately, to carry out this type of testing, the technology developer may need to link these scripts with the kernel, thereby potentially bloating the kernel, changing the kernel's behavior, and/or causing the kernel to perform poorly or inefficiently.

The instant disclosure, therefore, identifies and addresses a need for systems and methods for unit testing of functions on remote kernels.

SUMMARY

As will be described in greater detail below, the instant disclosure generally relates to systems and methods for unit testing of functions on remote kernels. In one example, a computer-implemented method for unit testing of functions on remote kernels may include (1) providing a framework that includes (A) a user-space component that runs at a client site and (B) a kernel-space component that runs at a remote site, (2) identifying, via the user-space component, one or more attributes of one or more objects that reside at the remote site and whose addresses at the remote site are unknown at the client site, (3) generating, via the user-space component, a script to test at least one function of a kernel running on the remote site based at least in part on the attributes of the objects, and then (4) performing a remote unit testing of the function of the kernel by executing, via the user-space component, the script such that the user-space component (A) generates a message that identifies the attributes of the objects and (B) sends the message to the kernel-space component that runs at the remote site to enable the kernel-space component to (I) obtain one or more references to the objects by way of the attributes of the objects and (II) invoke the function of the kernel by way of the references to the objects.

As another example, a system for implementing the above-described method may include a framework that includes a user-space component that runs at a client site and a kernel-space component that runs at a remote site. In this example, the user-space component may (1) identify one or more attributes of one or more objects that reside at the remote site and whose addresses at the remote site are unknown at the client site, (2) generate a script to test at least one function of a kernel running on the remote site based at least in part on the attributes of the objects, and (3) perform a remote unit testing of the function of the kernel by executing the script to (A) generate a message that identifies the attributes of the objects and (B) send the message to the kernel-space component that runs at the remote site to enable the kernel-space component to (I) obtain one or more references to the objects by way of the attributes of the objects and (II) invoke the function of the kernel by way of the references to the objects.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) provide a framework that includes (A) a user-space component that runs at a client site and (B) a kernel-space component that runs at a remote site, (2) identify, via the user-space component, one or more attributes of one or more objects that reside at the remote site and whose addresses at the remote site are unknown at the client site, (3) generate, via the user-space component, a script to test at least one function of a kernel running on the remote site based at least in part on the attributes of the objects, and then (4) perform a remote unit testing of the function of the kernel by executing, via the user-space component, the script such that the user-space component (A) generates a message that identifies the attributes of the objects and (B) sends the message to the kernel-space component that runs at the remote site to enable the kernel-space component to (I) obtain one or more references to the objects by way of the attributes of the objects and (II) invoke the function of the kernel by way of the references to the objects.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary table that identifies certain relationships between objects residing in a remote address space and their corresponding attributes and lookup functions.

Figure 1:
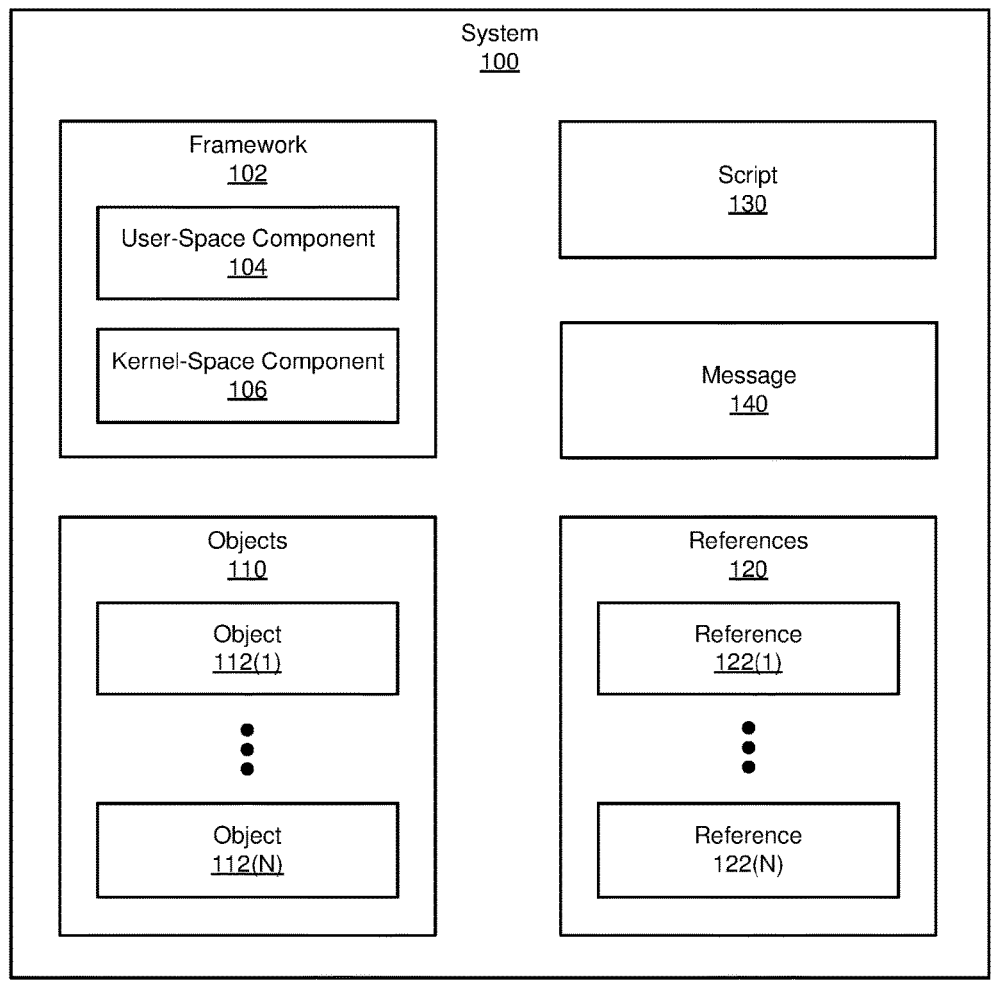
FIG. 1 is a block diagram of an exemplary system for unit testing of functions on remote kernels.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for unit testing of functions on remote kernels. As will be explained in greater detail below, embodiments of the instant disclosure may provide a unit-testing framework that includes a user-space component that runs in user space and a kernel-space component that runs in kernel space. By providing this unit testing framework, embodiments of the instant disclosure may enable the user-space component to perform unit testing of individual kernel functions and/or their parameters in the kernel space.

Although the user-space component may be unable to access and/or directly identify the addresses of certain objects that reside in the kernel space, the user-space component may be able to specify which objects to invoke as part of the unit testing on the kernel based at least in part on the attributes of those objects. Put another way, the kernel-space component may identify the addresses of objects whose attributes have been specified by the user-space component and then invoke individual functions and designated parameters corresponding to those addresses. In doing so, these embodiments may achieve greater flexibility of and/or control over unit testing of remote kernels. Additionally or alternatively, these embodiments may avoid the need to link test scripts with the kernel itself, thus reducing bloating of the kernel and/or improving the kernel's performance.

Moreover, these embodiments may enable the user-space component to modify and/or override an object and/or data that resides in the kernel space. Additionally or alternatively, these embodiments may enable the user-space component to generate a pipeline of function calls for execution within the kernel space. This pipeline of function calls may enable the kernel-space component to invoke and/or test all of the function calls included in the pipeline with a single command. By generating and/or feeding this pipeline of function calls to the kernel space, the user-space component may be able to provide a user operating in the user space with an interactive debugger. This debugger may run in the user space but have control over and/or debugging capabilities within the kernel space.

The term "unit testing," as used herein, generally refers to any type or form of software testing methodology and/or technique in which a specified unit and/or module of source code and/or machine code is tested for viability, reliability, and/or performance. The term "kernel," as used herein, generally refers to any type or form of OS kernel. In one example, the kernel may manage and/or mediate access to computing and/or network resources in connection with a network OS.

Figure 2:
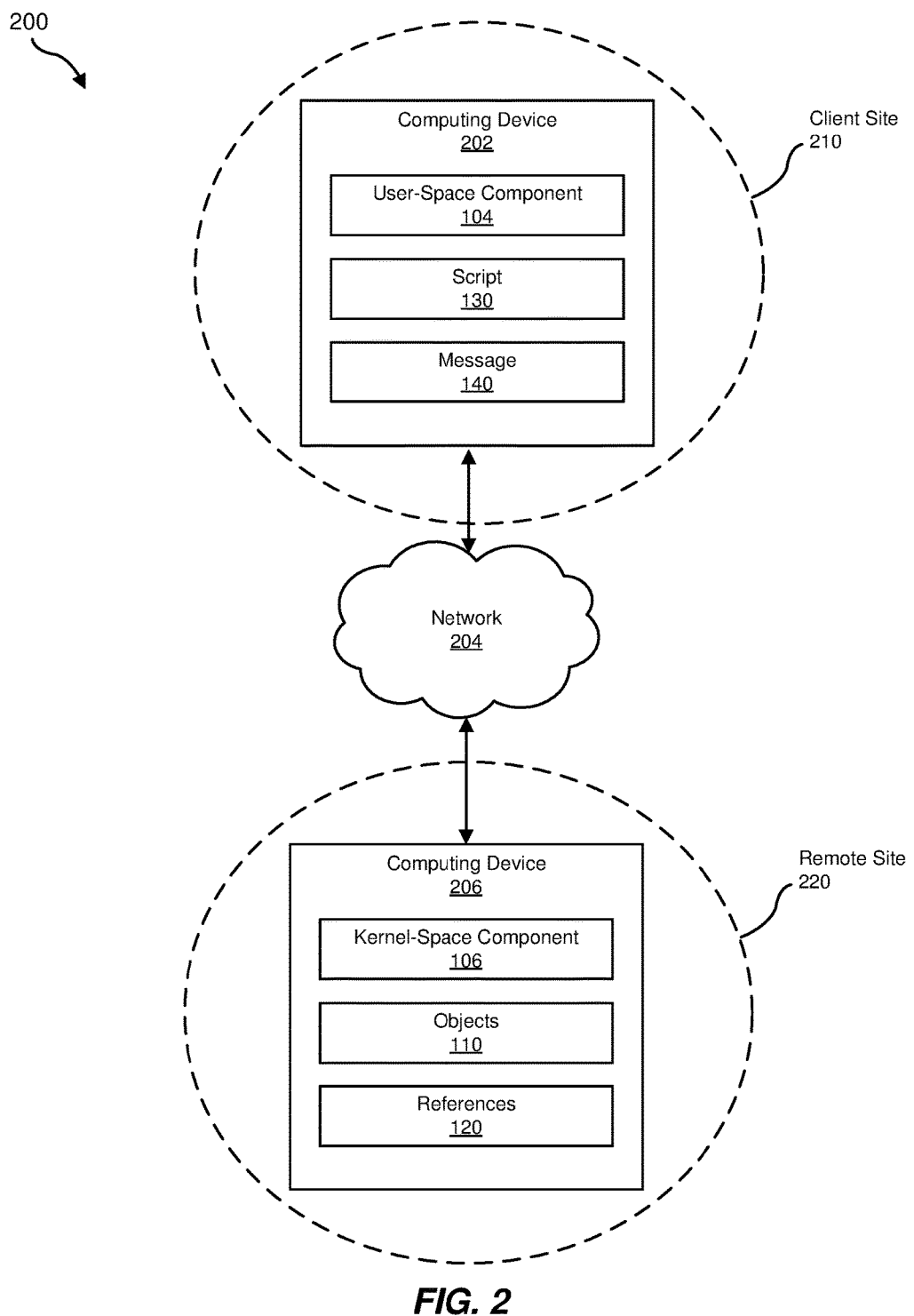
FIG. 2 is a block diagram of an additional exemplary system for unit testing of functions on remote kernels.

The following will provide, with reference to FIGS. 1 and 2, detailed descriptions of exemplary systems for unit testing of functions on remote kernels. Detailed descriptions of corresponding computer-implemented methods will be provided in connection with FIG. 3. Detailed descriptions of exemplary portions of an exemplary relationship table and exemplary attributes of objects will be provided in connection with FIGS. 4 and 5, respectively. In addition, detailed descriptions of an exemplary computing system will be provided in connection with FIG. 6.

FIG. 1 is a block diagram of an exemplary system 100 for unit testing of functions on remote kernels. As illustrated in this figure, exemplary system 100 may include a framework 102 that facilitates unit testing of functions on remote kernels. The term "framework," as used herein, generally refers to any type or form of development and/or testing structure, environment, tool, and/or platform that facilitates unit testing of functions on kernels. In one example, framework 102 may include and/or represent any set of Application Programming Interfaces (APIs), Application Binary Interfaces (ABIs), support programs, compilers, software or code libraries, tools, and/or components. Additionally or alternatively, framework 102 may include and/or represent certain components distributed across multiple physical and/or logical devices. Although illustrated as a single entity in FIG. 1, framework 102 may alternatively include and/or represent multiple frameworks available to and/or incorporated in system 100.

As illustrated in FIG. 1, framework 102 may include and/or represent a user-space component 104 that runs and/or operates in user space and a kernel-space component 106 that runs and/or operates in kernel space. The term "component," as used herein in connection with a framework, generally refers to any type or form of software application, program, and/or module stored on and/or configured to run on a computing device. In one example, user-space component 104 may, when executed by a computing device, cause the computing device to perform certain tasks directed to unit testing of functions on kernels. For example, user-space component 104 may generate and/or execute, in user space, a test script that facilitates performing unit testing on a remote kernel. In this example, the test script may, upon execution in user space on the computing device, direct the computing device to generate a message that identifies meaningful attributes of objects involved in a desired unit test and then send the message to kernel-space component 106 for consumption in kernel space.

In another example, kernel-space component 106 may, when executed by a computing device, cause the computing device to perform certain tasks directed to unit testing of functions in kernel space. For example, kernel-space component 106 may identify and/or obtain references to objects that reside in kernel space by way of those objects' attributes. In this example, kernel-space component 106 may direct the computing device to invoke and/or execute a function in connection with those objects by way of their references.

The term "user space," as used herein, generally refers to any type or form of memory and/or address space that has been designated for and/or allocated to application software and/or components. The term "kernel space," as used herein, generally refers to any type or form of memory and/or address space that has been designated for and/or allocated to an OS kernel and/or OS components. In some examples, user space and kernel space may include and/or represent mutually exclusive virtual memory allocations and/or execution contexts that are separate and/or segregated from one another.

As an example, user space may include and/or represent a specific address space at a client site, and kernel space may include and/or represent a different address space at a remote site. In this example, the client site and the remote site may be located on and/or represented as separate physical devices within a network. Additionally or alternatively, the client site and the remote site may be located on and/or represented as different address spaces on a single physical device. Accordingly, the client site and the remote site may represent different physical and/or virtual sites.

As illustrated in FIG. 1, exemplary system 100 may also include objects 110. The term "object," as used herein, generally refers to any type or form of location in memory and/or data stored at a location in memory. In one example, objects 110 may include and/or represent objects 112(1)-(N) that reside in kernel space. Examples of objects 112(1)-(N) include, without limitation, functions, variables, data structures, integers, characters, primitive types, next hops, classes, routes, physical and/or logical interfaces, records, indirections, route tables, buffers, offsets, host cache entries, addresses, variations or combinations of one or more of the same, or any other suitable objects.

As illustrated in FIG. 1, exemplary system 100 may further include references 120 to objects 110. The term "reference," as used herein, generally refers to any type or form of address, identifier, and/or offset that identifies and/or references the location of an object in memory. In some examples, references 120 may be unexposed, invisible, unavailable, and/or unknown to user-space component 104 in the user space. In addition, references 120 may include and/or represent references 122(1)-(N) that each identify and/or reference a location of one of objects 110. In one example, reference 122(1) may include and/or represent an address of object 112(1) stored in the address space of the kernel. Additionally or alternatively, reference 122(N) may include and/or represent an address of object 112(N) stored in the address space of the kernel.

As illustrated in FIG. 1, exemplary system 100 may additionally include a script 130 that facilitates testing a function of a remote kernel. The term "script," as used herein, generally refers to any type or form of executable file and/or code segment that automates the implementation of certain computing tasks. In one example, script 130 may, upon execution in user space at the client site, direct user-space component 104 and/or the underlying computing device to generate a message 140 that identifies attributes used to look up selected objects at a remote site and/or send message 140 to the kernel. As message 140 reaches the kernel, kernel-space component 106 may obtain references to the objects whose attributes are identified in message 140.

In one example, script 130 may include and/or represent a compiled program. In another example, script 130 may include and/or represent an uncompiled program. In some embodiments, script 130 may be executed by a compiled interpreter. In other embodiments, script 130 may be compiled by a certain process. Additionally or alternatively, script 130 may, as a compiled program, use a defined API and/or ABI. Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204. In one example, computing device 202 may include and/or represent a user address space designated and/or referred to as client site 210. Computing device 202 may be programmed with user-space component 104 of framework 102. In this example, computing device 202 may generate and/or execute script 130 in user space. Additionally or alternatively, computing device 202 may generate message 140 by executing script 130 and then send message 140 to computing device 206 via network 204.

In one example, computing device 206 may include and/or represent a kernel address space designated and/or referred to as remote site 220. In this example, computing device 206 may include, store, and/or maintain objects 110 at remote site 220. Additionally or alternatively, computing device 206 may include, store, and/or maintain references 120 that identify the memory locations of objects 110.

In one embodiment, one or more portions of framework 102 from FIG. 1 may, when executed by at least one processor of computing device 202 or 206, enable computing device 202 or 206 to facilitate unit testing of functions on remote kernels. For example, and as will be described in greater detail below, framework 102 may cause computing device 202 or 206 to (1) identify, via user-space component 104, certain attributes of objects 110 that reside at remote site 220 and whose addresses at remote site 220 are unknown to computing device 202, (2) generate, via user-space component 104, script 130 to test at least one function of a kernel running on remote site 220 based at least in part on those attributes of objects 110, and (3) perform a remote unit testing of the function of the kernel by executing, via user-space component 104, script 130 such that user-space component 104 (A) generates message 140 that identifies the attributes of objects 110 and (B) sends message 140 to kernel-space component 106 that runs at remote site 220 to enable kernel-space component 106 to (I) obtain references 120 to objects 110 by way of the attributes of objects 110 and (II) invoke the function of the kernel by way of references 120.

Computing devices 202 and 206 each generally represent any type or form of computing device capable of reading computer-executable instructions. Examples of computing devices 202 and 206 include, without limitation, routers, switches, modems, gateways, hubs, repeaters, servers, laptops, desktops, tables, mobile devices, cellular phones, Personal Digital Assistants (PDAs), multimedia players, embedded systems, wearable devices (e.g., smart watches, smart glasses, etc.), gaming consoles, internet-enabled televisions, BLU-RAY players, clusters, portions of one or more of the same, variations or combinations of one or more of the same, or any other suitable computing devices.

Network 204 generally represents any medium or architecture capable of facilitating communication or data transfer. Examples of network 204 include, without limitation, a MultiProtocol Label Switching (MPLS) network, an Internet Protocol (IP) network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network. Network 204 may facilitate communication or data transfer using wireless and/or wired connections. In one embodiment, network 204 may facilitate communication between computing devices 202 and 206. Although computing devices 202 and 206 are illustrated as being separate and distinct from network 204 in FIG. 2, computing devices 202 and 206 may alternatively represent portions of network 204 and/or be included in network 204.

Figure 3:
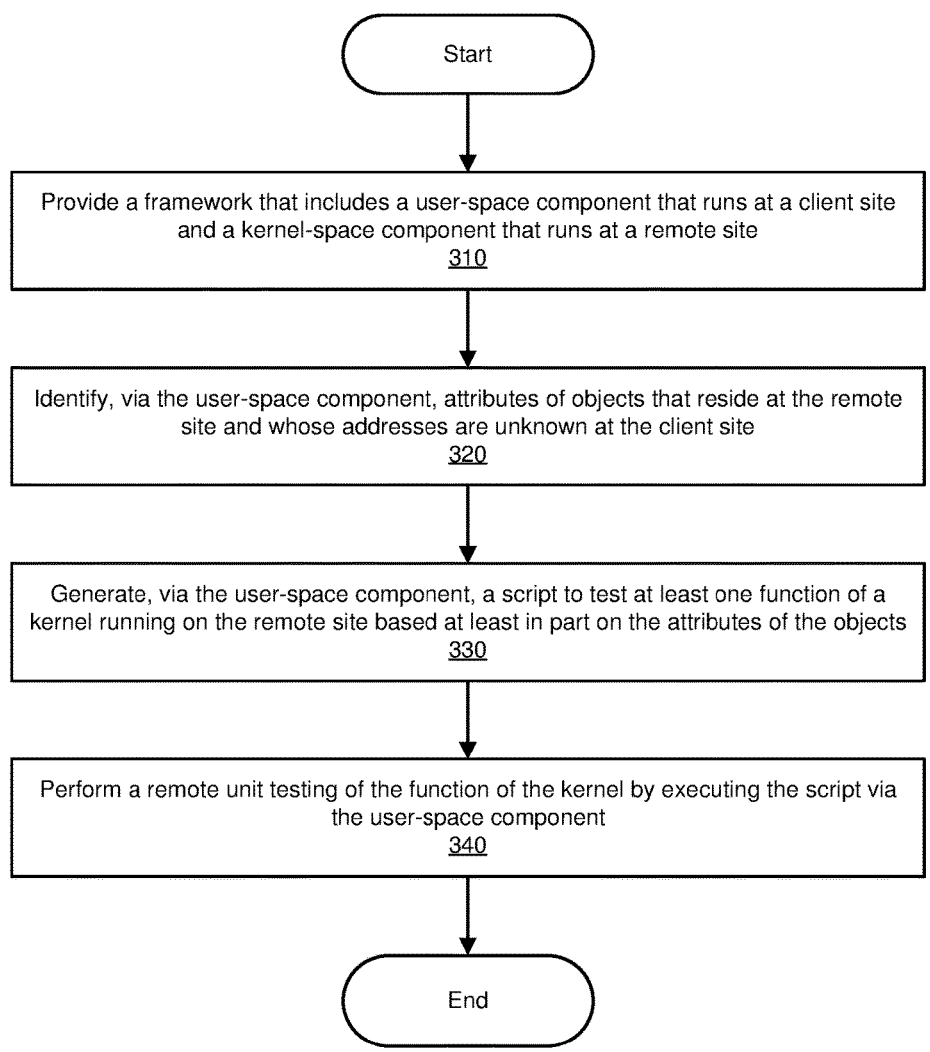
FIG. 3 is a flow diagram of an exemplary method for unit testing of functions on remote kernels.

FIG. 3 is a flow diagram of an exemplary computer-implemented method 300 for. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 600 in FIG. 6.

As illustrated in FIG. 3, at step 310 one or more of the systems described herein may provide a framework that includes a user-space component that runs at a client site and a kernel-space component that runs at a remote site. For example, framework 102 may, as part of computing devices 202 and 206 in FIG. 2, include and/or provide user-space component 104 that runs at client site 210 and kernel-space component 106 that runs at remote site 220. Accordingly, framework 102 may include and/or represent a distributed framework that provides application-specific functionality across multiple computing devices within network 204.

The systems described herein may perform step 310 in a variety of ways. In some examples, framework 102 may provide user-space component 104 at client site 210 and/or kernel-space component 106 at remote site 220 upon installation. For example, computing device 202 may download and/or install user-space component 104 at client site 210. In this example, computing device 206 may download and/or install kernel-space component 106 at remote site 220. Once these components are installed, framework 102 may provide application-specific functionality across computing devices 202 and 206 via network 204.

In some examples, framework 102 may be installed on computing devices 202 and 206 at the time of manufacturing. Accordingly, framework 102 may include and/or represent preinstalled software. Additionally or alternatively, framework 102 may be installed on computing devices 202 and 206 at a later point in time by a developer and/or administrator.

Returning to FIG. 3, at step 320 one or more of the systems described herein may identify one or more attributes of one or more objects that reside at the remote site and whose addresses at the remote site are unknown at the client site. For example, user-space component 104 may, as part of computing device 202 in FIG. 2, identify certain attributes of objects 110 that reside at remote site 220. In this example, the addresses of objects 110 at remote site 220 may not be exposed, visible, and/or known to user-space component 104 at client site 210.

The systems described herein may perform step 320 in a variety of ways. In some examples, user-space component 104 may identify the attributes based at least in part on a table that indicates which attributes uniquely describe and/or correspond to objects 110. For example, user-space component 104 may have access to a relationship table 400 in FIG. 4 that identifies certain relationships between objects residing at remote site 220 and their corresponding unique attributes. In this example, relationship table 400 may also identify the lookup functions corresponding to those objects.

As illustrated in FIG. 4, relationship table 400 may identify and/or indicate objects that reside at remote site 220 (in this example, "Kernel Function," "Integer, Character, Primitive Type," "Nexthop," "IPv4 Route," "IPv6 Route," "Logical Interface," "Physical Interface," "Route Table," "Mbuf," "Protocol Family," "Offset into Mbuf," "Host Cache Entry," "Kernel Global Variable," and "Kernel Object Address"), attributes used to look up references to those objects at remote site 220 (in this example, "Name of Function," "Value itself," "Nexthop Index," "Route Prefix, Type," "Route Prefix, Type," "Interface Index," "Interface Index," "Family Type, Interface Index," "Mbuf Data," "Family Type, Interface Offset Value," "Mbuf Parameter Index, Offset Value," "IPv6 Address, Interface Index," "Variable Name," and "Variable Name," respectively), and lookup or conversion functions for looking up references to the objects by way of the attributes ("linker_file_for_each( ), linker_file_lookup_symbol( )," "Identity Function," "rnh_lookup," "ip_rtmatch( )," "ip6_rtmatch( )," "ifl_lookup( )," "ifd_lookup( )," "GET_RTBL_FROMIFINDEX( )," "MGETHDR( )," "memcpy( )," "iff_lookup( )," "Array Indexing with [ ], Mtod, Addition," "patricia_lookup( )," "linker_file_for_each( ), linker_file_lookup_symbol( )," and "linker_file_for_each( ), linker_file_lookup_symbol( )," respectively).

Figure 5:
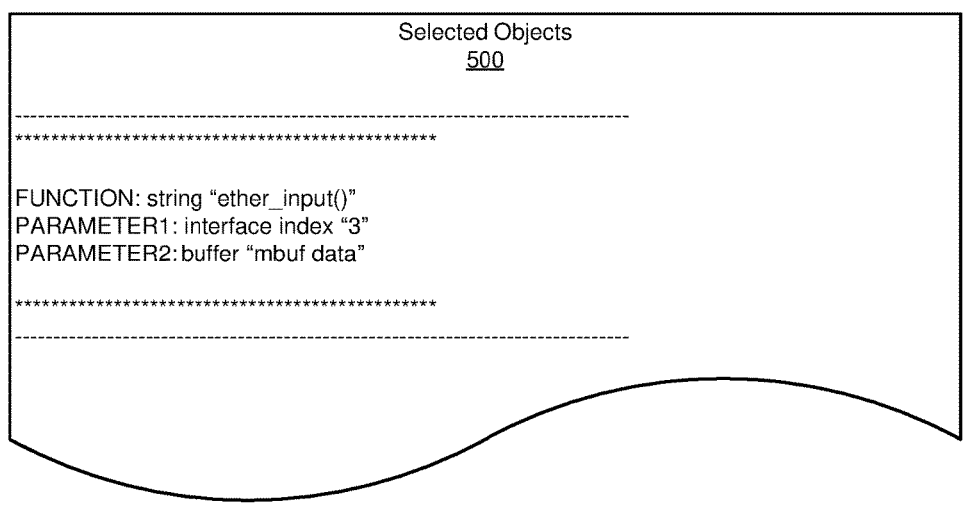
FIG. 5 is an illustration of exemplary attributes of objects selected in connection with unit testing of a function on a kernel.

In some examples, the attributes may uniquely describe and/or correspond to objects 110 with respect to their lookup functions. In one example, these attributes may effectively serve as a key for looking up the address of the selected object via the lookup function corresponding to that object. For example, user-space component 104 may identify attributes of selected objects 500 in FIG. 5 to perform a unit test on a function of the remote kernel. As illustrated in FIG. 5, attributes of selected objects 500 may include and/or identify a function name (in this example, "string 'ether_input( )'"), a first parameter for the function (in this example, "interface index '3'"), and a second parameter for the function (in this example, "buffer 'mbuf data'").

Continuing with this example, user-space component 104 may determine, based at least in part on relationship table 400, that kernel-space component 106 is able to look up the addresses of the "ether_input( )" function, the physical interface with index "3", and the buffer with certain "mbuf data" by way of these attributes. In other words, user-space component 104 may determine which attributes of the selected objects are used to look up references to the selected objects at remote site 220. In one example, kernel-space component 106 may effectively create the buffer from "mbuf data" as part of this operation. In this example, the buffer may include and/or represent a complex object whose creation involves more functions than just those lookup functions listed in relationship table 400.

In some examples, the parameters and/or arguments of the lookup functions listed in relationship table 400 may involve and/or necessitate the creation of objects. Additionally or alternatively, the parameters and/or arguments of the lookup functions listed in relationship table 400 may include and/or represent static data.

In one example, user-space component 104 may select the objects for unit testing based at least in part on user input. For example, a user may enter a selection of a function and/or certain parameters to remotely test on the kernel via a user interface (such as a command line interface) at client site 210. In response to the user's selection, user-space component 104 may identify the attributes of the selected objects that facilitate looking up the addresses of those objects at remote site 220.

In another example, user-space component 104 may select the objects for unit testing by iterating through certain functions and/or parameters available at remote site 220. Additionally or alternatively, user-space component 104 may select the objects for unit testing by randomly choosing certain functions and/or parameters available at remote site 220. In either case, user-space component 104 may then identify the attributes of the selected objects that facilitate looking up the addresses of those objects at remote site 220.

Returning to FIG. 3, at step 330 one or more of the systems described herein may generate a script to test at least one function of a kernel running on the remote site. For example, user-space component 104 may, as part of computing device 202 in FIG. 2, generate script 130 to test at least one function of a kernel running at remote site 220 based at least in part on the attributes.

The systems described herein may perform step 330 in a variety of ways. In some examples, user-space component 104 may generate script 130 based at least in part on user input. For example, a user may enter a selection of a function and/or certain parameters to remotely test on the kernel via a user interface (such as a command line interface) at client site 210. In response to the user's selection, user-space component 104 may build script 130 to include and/or identify the selected objects and/or the attributes of the selected objects that facilitate looking up the addresses of those objects at remote site 220. Script 130 may essentially automate, at client site 210, the implementation of computing tasks needed to achieve unit testing of one or more functions at remote site 220.

In other examples, user-space component 104 may build script 130 to iterate through certain functions and/or parameters available at remote site 220. Additionally or alternatively, user-space component 104 may build script 130 by randomly choosing certain functions and/or parameters available at remote site 220 for unit testing.

Returning to FIG. 3, at step 340 one or more of the systems described herein may perform a remote unit testing of the function of the kernel by executing the script. For example, user-space component 104 may, as part of computing device 202 in FIG. 2, perform the remote unit testing of the function of the kernel by executing script 130. Upon execution, script 130 may direct and/or cause user-space component 104 and/or computing device 202 to generate message 140 that identifies the attributes of the selected objects and/or sends message 140 to remote site 220.

The systems described herein may perform step 340 in a variety of ways. In some examples, user-space component 104 may perform the remote unit testing of the kernel function by marshalling the attributes of the selected objects into message 140. In other words, user-space component 104 may arrange the attributes of the selected objects in a specific order for consumption by kernel-space component 106 at remote site 220. For example, user-space component 104 may marshal attributes of selected objects 500 in FIG. 5 into message 140 in an arrangement that causes kernel-space component 106 to invoke the "ether_input( )" function with interface index "3" and the specified "mbuf data" as parameters.

Upon generating message 140, user-space component 104 may send message 140 to computing device 206 via network 204. As message 140 arrives at computing device 206, kernel-space component 106 may read message 140 to identify the attributes of objects 110 in message 140. For example, kernel-space component 106 may identify the "ether_input( )" function name attribute, the interface index "3" attribute, and the specified "mbuf data" attribute in message 140.

In some examples, kernel-space component 106 may obtain references 120 to objects 110 by entering the attributes of objects 110 into the corresponding lookup functions. Kernel-space component 106 may identify the correct lookup function for a particular object in various ways. In one example, message 140 may identify by name each lookup function that corresponds to an attribute. In another example, message 140 may identify the types of attributes being used to look up the references to the selected objects. Additionally or alternatively, message 140 may identify the types of objects whose references need to be looked up by way of the attributes. In any case, kernel-space component 106 may use this information included in message 140 in conjunction with relationship table 400 (or the like) to determine which lookup functions apply and/or correspond to the attributes included in message 140. As an alternative example, kernel-space component 106 may use this information included in message 140 in conjunction with static mappings for certain variable resolutions.

Upon identifying the correct lookup functions, kernel-space component 106 may enter the attributes into those lookup functions to determine the addresses of objects 110 at remote site 220. For example, kernel-space component 106 may (1) enter the "ether_input( )" function name attribute into the "linker_file_for_each( )", lookup function and/or the "linker_file_lookup_symbol( )", lookup function, (2) enter the interface index "3" attribute into the "ifl_lookup( )", lookup function, and (3) populate a buffer created by the MGETHDR( ) function with the specified "mbuf data". In this example, these attributes may effectively serve as keys for looking up the addresses of the corresponding objects via those lookup functions. The lookup functions may return the addresses of the objects whose attributes were entered. Additionally or alternatively, kernel-space component 106 may capture the results of the lookups for use in executing a queue and/or pipeline of function calls as a single block.

As a result, kernel-space component 106 may be able to invoke the selected function of the kernel running on remote site 220 by way of the function's address in memory. Moreover, kernel-space component 106 may be able to pass the selected parameters that reside at remote site 220 to the function by way of the parameters' addresses in memory. For example, kernel-space component 106 may invoke the "ether_input( )" function by executing the code at the memory location returned by into the "linker_file_for_each( )", lookup function and/or the "linker_file_lookup_symbol( )", lookup function. In this example, kernel-space component 106 may pass the interface and buffer parameters to the "either_input( )" function by feeding the code or data stored at the memory locations returned by the "ifl_lookup( )" lookup function and/or the "MGETHDR( )", lookup function to the "either_input( )" function.

In some examples, kernel-space component 106 may generate one or more packets that correspond to the function of the kernel. For example, kernel-space component 106 may build packets that are stored in an "mbuf" object. Upon building these packets, kernel-space component 106 may inject the packets into a stack of the kernel at any desired location by calling the corresponding function with the specified parameters.

In some examples, kernel-space component 106 may obtain a return value from the function of the kernel. For example, kernel-space component 106 may obtain a return value from the "ether_input( )" function upon invocation. In this example, kernel-space component 106 may then send this return value to user-space component 104 via network 204.

By sending this return value to user-space component 104 in this way, kernel-space component 106 may enable user-space component 104 to apply the return value at client site 210. For example, the return value may include and/or represent a reference to an object that resides at remote site 220. Accordingly, user-space component 104 may apply, as part of script 130 and/or a subsequent script, this reference to the object as a parameter to be passed to another function of the kernel. In this example, user-space component 104 may continue executing script 130 or begin executing a subsequent script.

In doing so, user-space component 104 may generate another message that identifies this reference to the object as a parameter to be passed to the other function of the kernel. User-space component 104 may then send this other message to kernel-space component 106 via network 204. By sending the other message in this way, user-space component 104 may enable kernel-space component 106 to pass the object as a parameter to the other function of the kernel during invocation of the other function.

In some examples, user-space component 104 may modify and/or manipulate an object that resides at remote site 220. For example, user-space component 104 may generate a further message that indicates a function of the kernel to be overridden at remote site 220. In this example, user-space component 104 may send this message to kernel-space component 106 via network 204.

By sending the message in this way, user-space component 104 may enable kernel-space component 106 to override the function at remote site 220. For example, kernel-space component 106 may insert a hook (such as an API hook) and/or trap mechanism at the entry point of the function to facilitate transferring control of execution from that function to a hook function. Once the transfer of control and/or execution has been accomplished, the hook function may pass one or more parameters that were initially intended for the original function to user-space component 104 via network 204.

By passing those parameters in this way, the hook function may enable user-space component 104 to invoke an additional function and/or functional logic at client site 210 in connection with those parameters. In one example, this additional function and/or functional logic may, upon execution, cause user-space component 104 to obtain a copy (e.g., a shallow copy) of the object from remote site 220 to be modified and/or manipulated. In this example, user-space component 104 may also modify and/or manipulate the copy of the object at client site 210 and then replace the object residing at remote site 220 with the copy of the object that was modified and/or manipulated at client site 210.

In some examples, user-space component 104 may perform unit testing on multiple functions of the remote kernel in sequence. For example, user-space component 104 may create, at client site 210, a queue and/or pipeline of calls to multiple functions of the kernel at remote site 220. In this example, user-space component 104 may feed the queue and/or pipeline of calls to kernel-space component 106 via network 204. By feeding the queue and/or pipeline of calls in this way, user-space component 104 may enable kernel-space component 106 to invoke the multiple functions sequentially by way of a single command.

In one example, user-space component 104 may provide an interactive debugger to a user of computing device 202 at client site 210. In this example, the interactive debugger may obtain user input from the user at client site 210. User-space component 104 may then create the queue and/or pipeline of calls based at least in part on the user input. For example, the user of computing device 202 may enter input that directs user-space component 104 to create a queue and/or pipeline of specific kernel calls along with corresponding parameters. In response to this user input, user-space component 104 may create the queue and/or pipeline of calls and then feed the same to kernel-space component 106 without necessarily compiling any executable code directed to the queue and/or pipeline of calls at client site 210. Upon receiving the queue and/or pipeline of calls, kernel-space component 106 may invoke the queue and/or pipeline with a single command.

This type of interactive debugger may provide certain advantages over traditional kernel debuggers. Examples of these advantages include, without limitation, enabling the kernel to continue executing normally during debugging, launching multiple and/or new threads, running macros supported and/or compiled by the kernel, enabling users to write complex test scripts using a C programming language API, facilitating support for script files, displaying and/or modifying complex types (such as structures and/or unions), providing support for additional programming languages (such as PYTHON and/or RUBY) to conduct interactive debugging and/or execute debugging scripts by way of the C programming language API, variations or combinations of one or more of the same, or any other suitable advantages.

As explained above in connection with FIGS. 1-5, framework 102 may facilitate unit testing of functions on remote kernels. For example, although the addresses of objects 110 are not visible and/or known at client site 210, user-space component 104 may be able to specify which of objects 110 to invoke as part of the unit testing of a kernel at remote site 220 based at least in part on the attributes of those objects. Put another way, kernel-space component 106 may identify the addresses of objects 110 whose attributes have been specified by user-space component 104 and then invoke individual functions and designated parameters corresponding those addresses. In doing so, framework 102 may achieve and/or provide greater flexibility of and/or control over unit testing of remote kernels. Additionally or alternatively, framework 102 may enable developers to avoid the need to link test scripts with the kernel itself, thus reducing bloating of the kernel and/or improving the kernel's performance.

Figure 6:
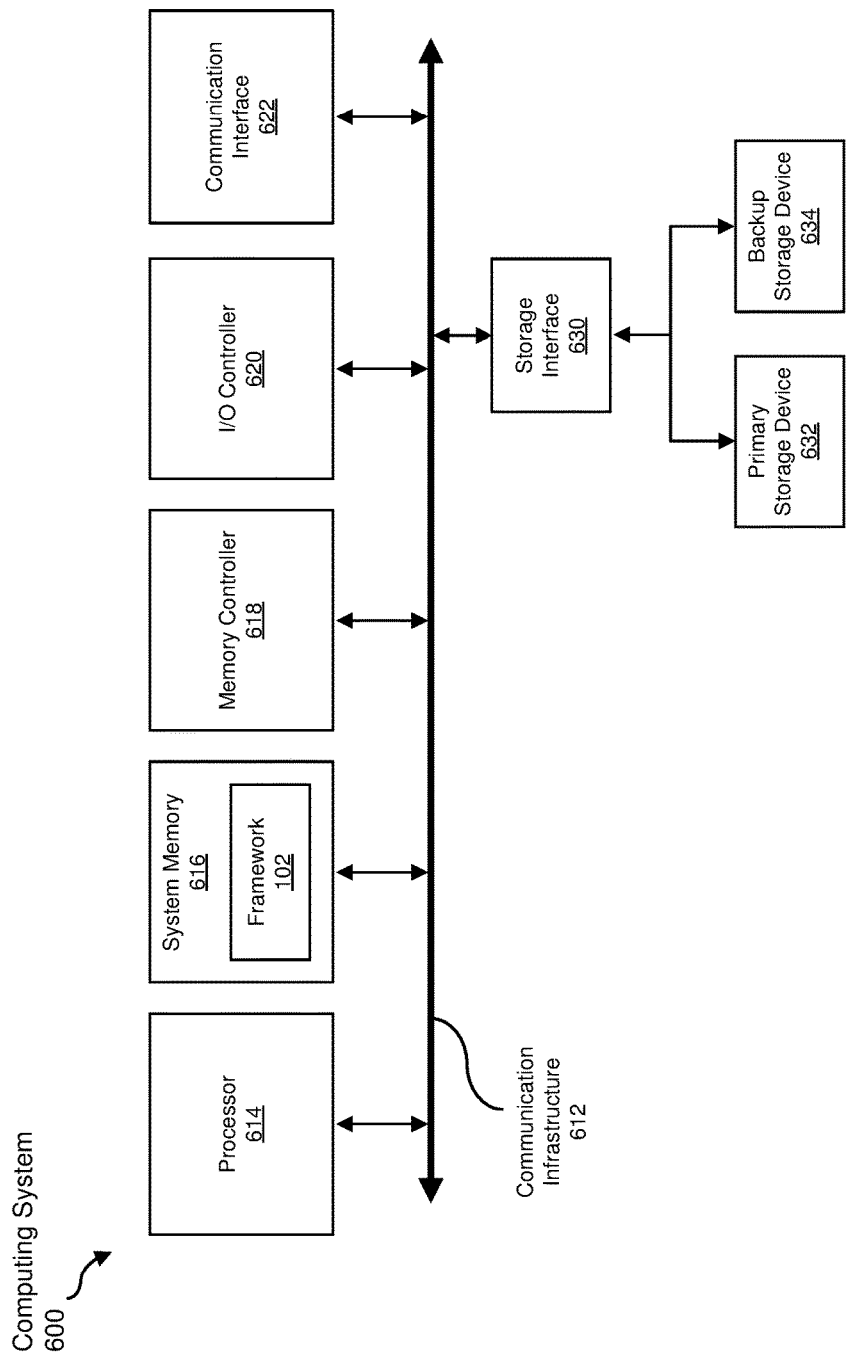
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include and/or store all or a portion of framework 102 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
providing a framework that includes:
    a user-space component that runs at a client site; and
    a kernel-space component that runs at a remote site;
identifying, via the user-space component, one or more attributes of one or more objects that reside at the remote site and whose addresses at the remote site are unknown at the client site;
generating, via the user-space component, a script to test at least one function of a kernel running on the remote site based at least in part on the attributes of the objects; and
performing a remote unit testing of the function of the kernel by executing, via the user-space component, the script such that the user-space component:
    generates a message that identifies the attributes of the objects; and
    sends the message to the kernel-space component that runs at the remote site to enable the kernel-space component to:

obtain one or more references to the objects by way of the attributes of the objects; and invoke the function of the kernel by way of the references to the objects.

2. The method of claim 1, wherein generating the message that identifies the attributes of the objects comprises marshalling the attributes into the message for consumption by the kernel-space component.

3. The method of claim 1, wherein the objects comprise:
the function of the kernel; and
at least one parameter to be passed to the function of the kernel.

4. The method of claim 3, wherein obtaining the references to the objects comprises:
obtaining an address of the function of the kernel;
obtaining a reference to the parameter to be passed to the function during the invocation of the function; and
invoking the function of the kernel comprises:
obtaining the parameter based at least in part on the reference; and
passing the parameter to the function during the invocation of the function.

5. The method of claim 1, wherein obtaining the references to the objects comprises:
identifying a lookup function that corresponds to an object; and
looking up a reference to the object by entering an attribute of the object as an input into the lookup function.

6. The method of claim 1, wherein identifying the attributes of the objects that reside at the remote site comprises:
selecting an object that resides at the remote site; and
determining which attribute of the selected object is used to look up a reference to the selected object at the remote site.

7. The method of claim 1, wherein invoking the function of the kernel comprises:
generating one or more packets that correspond to the function of the kernel; and
injecting the packets into a stack of the kernel at a location corresponding to the function of the kernel.

8. The method of claim 1, wherein invoking the function of the kernel comprises:
obtaining a return value of the function of the kernel; and
sending the return value to the user-space component that runs at the client site to enable the user-space component to apply the return value at the client site.

9. The method of claim 8, wherein:
the return value comprises a reference to an object that resides at the remote site;
applying the return value at the client site comprises applying, as part of the script, the reference to the object as a parameter to be passed to another function of the kernel; and
performing the remote unit testing of the function of the kernel comprises continuing to execute, via the user-space component, the script such that the user-space component:
generates another message that identifies the reference to the object as the parameter to be passed to the other function of the kernel; and
sends the other message to the kernel-space component to enable the kernel-space component to pass the parameter to the other function of the kernel during invocation of the other function.

10. The method of claim 1, further comprising modifying, via the user-space component, an object that resides at the remote site by:
generating a further message that indicates a further function of the kernel to be overridden at the remote site; and
sending the further message to the kernel-space component that runs at the remote site to enable the kernel-space component to override the further function of the kernel at the remote site by inserting a hook at an entry point of the further function to facilitate transferring control of execution from the further function of the kernel to a hook function that passes one or more parameters to the user-space component such that the user-space component invokes an additional function at the client site that:
obtains a copy of the object that resides at the remote site;
modifies the copy of the object at the client site; and
replaces the object that resides at the remote site with the modified copy of the object.

11. The method of claim 1, wherein:
the function of the kernel comprises a plurality of functions of the kernel;
generating the message that identifies the attributes of the objects comprises creating a pipeline of calls to the plurality of functions of the kernel; and
sending the message to the kernel-space component that runs at the remote site comprises feeding the pipeline of calls to the kernel-space component to enable to the kernel-space component to invoke the plurality of functions sequentially by way of a single command.

12. The method of claim 11, wherein feeding the pipeline of calls to the kernel-space component comprises providing, at the client site, an interactive debugger that facilitates:
obtaining user input at the client site;
creating, based at least in part on the user input, the pipeline of calls to the plurality of functions of the kernel; and
feeding the pipeline of calls to the kernel-space component without compiling any executable code directed to the pipeline of calls at the client site.

13. A system comprising:
a framework, stored in memory, that includes:
a user-space component that runs at a client site; and
a kernel-space component that runs at a remote site;
wherein the user-space component:
identifies one or more attributes of one or more objects that reside at the remote site and whose addresses at the remote site are unknown at the client site;
generates a script to test at least one function of a kernel running on the remote site based at least in part on the attributes of the objects; and
performs a remote unit testing of the function of the kernel by executing the script to:
generate a message that identifies the attributes of the objects; and
send the message to the kernel-space component that runs at the remote site to enable the kernel-space component to:
obtain one or more references to the objects by way of the attributes of the objects; and
invoke the function of the kernel by way of the references to the objects;
at least one physical processor that executes the framework stored in memory.

14. The system of claim 13, wherein the user-space component generates the message that identifies the attributes of the objects by marshalling the attributes into the message for consumption by the kernel-space component.

15. The system of claim 13, wherein the objects comprise:
the function of the kernel; and
at least one parameter to be passed to the function of the kernel.

16. The system of claim 15, wherein the kernel-space component:
obtains the references to the objects by:
obtaining an address of the function of the kernel;
obtaining a reference to the parameter to be passed to the function during the invocation of the function; and
invokes the function of the kernel by:
obtaining the parameter based at least in part on the reference; and
passing the parameter to the function during the invocation of the function.

17. The system of claim 13, wherein the kernel-space component:
identifies a lookup function that corresponds to an object; and
looks up a reference to the object by entering an attribute of the object as an input into the lookup function.

18. The system of claim 13, wherein the user-space component identifies the attributes of the objects that reside at the remote site by:
selecting an object that resides at the remote site; and
determining which attribute of the selected object is used to look up a reference to the selected object at the remote site.

19. The system of claim 13, wherein the kernel-space component invokes the function of the kernel by:
generating one or more packets that correspond to the function of the kernel; and
injecting the packets into a stack of the kernel at a location corresponding to the function of the kernel.

20. A non-transitory computer-readable medium comprising one or more computer-executable instructions that, when executed by at least one processor of a computing device, cause the computing device to:
provide a framework that includes:
a user-space component that runs at a client site; and
a kernel-space component that runs at a remote site;
identify, via the user-space component, one or more attributes of one or more objects that reside at the remote site and whose addresses at the remote site are unknown at the client site;
generate, via the user-space component, a script to test at least one function of a kernel running on the remote site based at least in part on the attributes of the objects; and
perform a remote unit testing of the function of the kernel by executing, via the user-space component, the script such that the user-space component:
generates a message that identifies the attributes of the objects; and
sends the message to the kernel-space component that runs at the remote site to enable the kernel-space component to:
obtain one or more references to the objects by way of the attributes of the objects; and
invoke the function of the kernel by way of the references to the objects.

* * * * *